(12) United States Patent
Sheldon et al.

(10) Patent No.: US 9,395,561 B2
(45) Date of Patent: Jul. 19, 2016

(54) EYEGLASSES HAVING FLIP-UP LENSES

(71) Applicant: Brent Sheldon, Montreal (CA)

(72) Inventors: Brent Sheldon, Montreal (CA); Robert Katz, Montreal (CA); Sylvain Duchesne, Bromont (CA)

(73) Assignee: Brent Sheldon, Miami, FL (US)

( * ) Notice: Subject to any disclaimer, the term of this patent is extended or adjusted under 35 U.S.C. 154(b) by 0 days.

(21) Appl. No.: 14/338,831

(22) Filed: Jul. 23, 2014

(65) Prior Publication Data

US 2016/0026002 A1  Jan. 28, 2016

(51) Int. Cl.
  *G02C 7/08* (2006.01)
  *G02C 9/04* (2006.01)
  *G02C 9/02* (2006.01)

(52) U.S. Cl.
  CPC *G02C 7/086* (2013.01); *G02C 9/02* (2013.01); *G02C 2200/02* (2013.01); *G02C 2202/02* (2013.01)

(58) Field of Classification Search
  CPC .......... G02C 7/08; G02C 7/086; G02C 7/088; G02C 9/00; G02C 9/02; G02C 9/04
  USPC ................................. 351/47, 57, 58
  See application file for complete search history.

(56) References Cited

U.S. PATENT DOCUMENTS

| | | | |
|---|---|---|---|
| 4,511,226 A | 4/1985 | Freeman | |
| 5,737,054 A | 4/1998 | Chao | |
| 5,867,244 A | 2/1999 | Martin | |
| 6,089,708 A * | 7/2000 | Ku | G02C 9/00 351/47 |
| 6,139,142 A | 10/2000 | Zelman | |
| 6,170,949 B1 | 1/2001 | Mauch | |
| 6,283,591 B1 * | 9/2001 | Chen | G02C 9/00 351/47 |
| 6,331,057 B1 | 12/2001 | Strube | |
| 6,354,703 B1 | 3/2002 | Sadler | |
| 6,450,637 B1 | 9/2002 | Zelman | |
| 6,698,881 B1 | 3/2004 | Kim | |
| 6,783,234 B1 * | 8/2004 | Hong | G02C 9/02 351/47 |
| 6,789,893 B1 | 9/2004 | Hong | |
| 6,820,976 B2 | 11/2004 | Ifergan | |
| 6,997,551 B2 | 2/2006 | James | |
| RE39,066 E | 4/2006 | Mauch | |
| 7,040,750 B2 | 5/2006 | Smith et al. | |

(Continued)

FOREIGN PATENT DOCUMENTS

WO  2004057410  7/2004

OTHER PUBLICATIONS

International Search Report issued by the Canadian Intellectual Property Office as the PCT Searching Authority on Applicant's related PCT Application No. PCT/CA2015/000421.

*Primary Examiner* — Darryl J Collins
(74) *Attorney, Agent, or Firm* — Klintworth & Rozenblat IP LLC

(57) ABSTRACT

A pair of eyeglasses has a flip-up lens assembly The flip-up lens assembly includes a connector having a base with left and right extensions which are pivotally connected at their respective distal ends to an upper part of right and left sections of a secondary frame which retain a pair of flip-up lenses. A nose bridge of a primary frame which retains a pair of primary lenses includes a first magnet and the base of the connector includes a second magnet such that the flip-up lens assembly can be removably attached to the primary frame when the base of the connector is secured to the nose bridge of the primary frame by magnetic forces between the two magnets.

10 Claims, 5 Drawing Sheets

(56) References Cited

U.S. PATENT DOCUMENTS

| | | |
|---|---|---|
| 7,108,371 B1 | 9/2006 | Ifergan |
| 7,600,870 B2 | 10/2009 | Zelazowski |
| 2002/0131013 A1 | 9/2002 | Onami et al. |
| 2004/0080708 A1 | 4/2004 | Park |
| 2004/0135966 A1* | 7/2004 | Dietz .................. G02C 9/02 351/41 |
| 2005/0052611 A1 | 3/2005 | Cheng |
| 2005/0052613 A1* | 3/2005 | Kidouchim ............ G02C 9/00 351/47 |
| 2005/0062929 A1 | 3/2005 | Ng |
| 2005/0088612 A1 | 4/2005 | Smith et al. |
| 2005/0174530 A1 | 8/2005 | Ifergan |
| 2005/0275796 A1* | 12/2005 | Park .................. G02C 9/00 351/41 |
| 2006/0007387 A1 | 1/2006 | Xiao |
| 2006/0126007 A1 | 6/2006 | Smith |
| 2006/0203186 A1 | 9/2006 | Ifergan |
| 2006/0262268 A1* | 11/2006 | Kim .................. G02C 9/04 351/47 |
| 2006/0290881 A1 | 12/2006 | Yu |
| 2007/0013863 A1 | 1/2007 | Zelazowski |
| 2007/0132942 A1 | 6/2007 | Zelazowski |
| 2007/0153228 A1* | 7/2007 | Zelman ............... G02C 9/00 351/47 |
| 2007/0236653 A1 | 10/2007 | Lee et al. |
| 2010/0060846 A1 | 3/2010 | Zelazowski |
| 2012/0069292 A1 | 3/2012 | Park |

\* cited by examiner

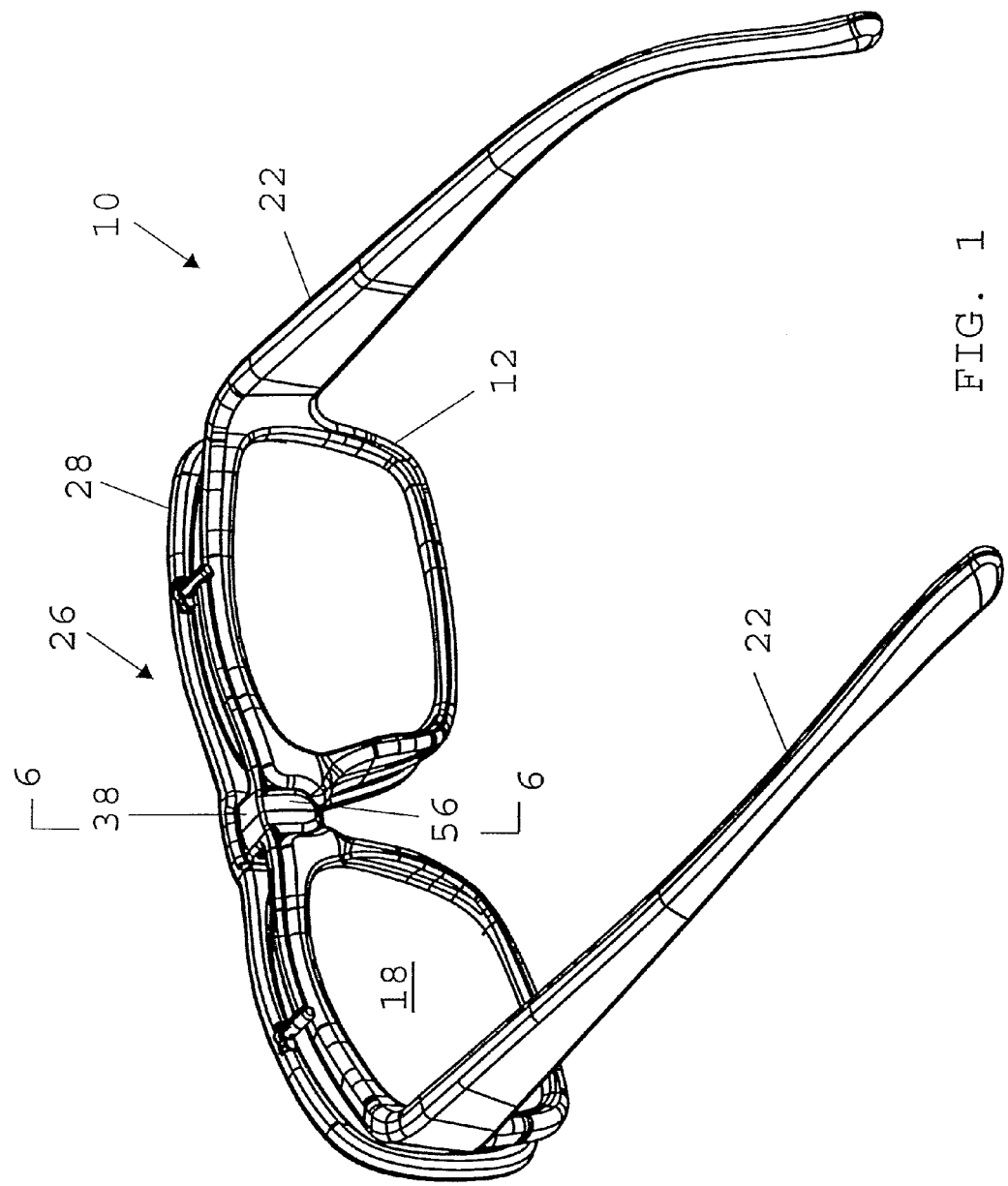

EYEGLASSES HAVING FLIP-UP LENSES

TECHNICAL FIELD

The described subject matter relates generally to an improvement on a structure of eyeglasses and more particularly to a structure of eyeglasses having flip-up lenses.

BACKGROUND OF THE ART

Various kinds of sun shade auxiliary lens assemblies which can be detachably attached to spectacles have been used instead of sunglasses. Among others, an auxiliary lens assembly is adapted for pivotable and removable attachment to a primary lens assembly with a support system which utilizes pivotable hinges integral with the auxiliary frame in order to permit pivoting of the auxiliary frame from a first position in which the auxiliary lenses are substantially parallel to the primary lenses, to a second position in which the auxiliary frame is pivoted to a position substantially perpendicular to the orientation of the primary frame. However, in conventional auxiliary eyewear support systems having pivotable hinges such as described in U.S. Pat. No. 7,040,750 to Smith et al., the positioning of the pivotal hinges may allow the auxiliary lens frame with the auxiliary lenses to flip over and cause the top of the auxiliary lens frame and lenses to extend substantially behind the upper portion of the primary frame, when the auxiliary frame is pivoted into the second position. In such a position the top of the auxiliary frame may be in contact with the user's face causing discomfort to the user.

There is a need to develop an improved design for eyeglasses and flip-up lens assemblies to overcome the shortcomings of the conventional design thereof.

SUMMARY

In one aspect, there is provided eyeglasses comprising a primary frame having opposed side ends and including primary left and right sections retaining a pair of primary lenses, respectively, a first nose bridge being disposed between and interconnecting the primary left and right sections, a support device being operatively attached to the respective opposed side ends of the primary frame for supporting the eyeglasses on a user's head, the first nose bridge including a first magnet; a secondary frame including secondary left and right sections retaining a pair of secondary lenses, respectively, a second nose bridge being disposed between and interconnecting the secondary left and right sections; and a connector including a base and left and right extensions extending in opposite directions away from the base and terminating at respective left and right distal ends, the respective left and right distal ends being pivotally connected to an upper part of the respective secondary left and right sections of the secondary frame about an axis substantially transverse to a user's viewing direction through the eyeglasses in order to allow the secondary frame with the secondary lenses to pivot from a first position in which the second nose bridge is adjacent and aligned with the base, to a second position in which the second nose bridge flips up and away from the base, the base including a second magnet to allow the base of the connector to be removably attached to the first nose bridge of the primary frame by magnetic forces between the first and second magnets.

In another aspect, there is provided eyewear comprising: a primary frame having opposed side ends and retaining at least one primary lens, a support device being operatively attached to the respective opposed side ends of the primary frame for supporting the eyewear on a user's head, and a first magnet attached to a central point of an upper part of the primary frame extending between the opposed side ends; a secondary frame retaining at least one secondary lens, the secondary frame having an upper part extending between opposed side ends of the secondary frame; and a connector including a base and left and right extensions extending in opposite directions away from the base and terminating at respective left and right distal ends, the respective left and right distal ends being pivotally connected to the upper part of the secondary frame about an axis substantially transverse to a user's viewing direction through the eyewear in order to allow the secondary frame with the secondary lenses to pivot from a first position in which a central point of the upper part of the secondary frame is adjacent and aligned with the base, to a second position in which the central point of the upper part of the secondary frame flips up and away from the base, the base including a second magnet to allow the base of the connector to be removably attached to the central point of the upper part of the primary frame by magnetic forces.

Optionally, the upper part of the respective secondary left and right sections of the secondary frame each comprises a curved profile having an apex to which the distal ends of the respective left and right extensions is pivotally connected.

Optionally, the distal ends of the respective left and right extension of the connector each comprise a support member supported on an upper part of the respective primary left and right sections of the primary frame when the base of the connector is attached to the first nose bridge.

Other aspects or features of the described subject matter will be better understood with reference to the embodiments described hereinafter.

DESCRIPTION OF THE DRAWINGS

Reference is now made to the accompanying drawings, showing by way of illustration the described embodiments thereof in which:

FIG. 1 is an isometric view of an eyeglasses with flip-up lenses according to one embodiment;

It will be noted that throughout the appended drawings, like features are identified by like reference numerals.

DETAILED DESCRIPTION

Figure 3:
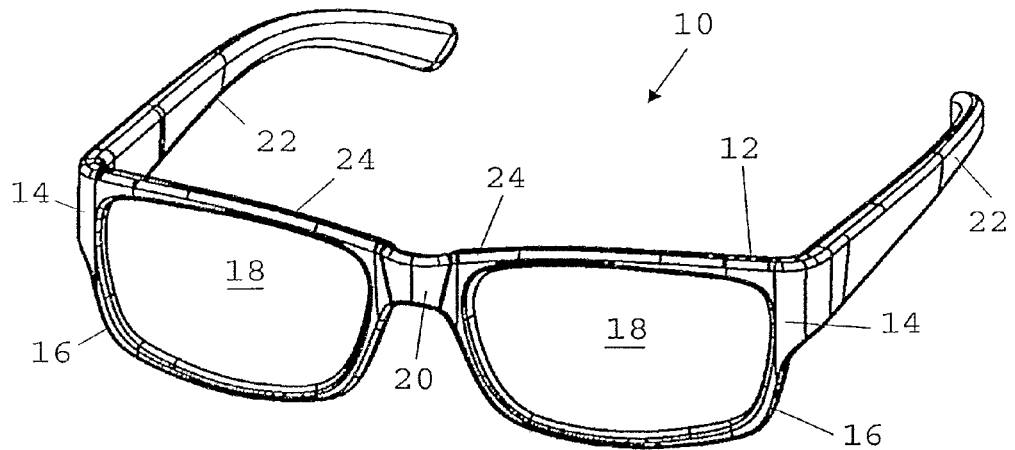
FIG. 3 is a front isometric view of the primary frame structure of FIG. 2.
Figure 2:
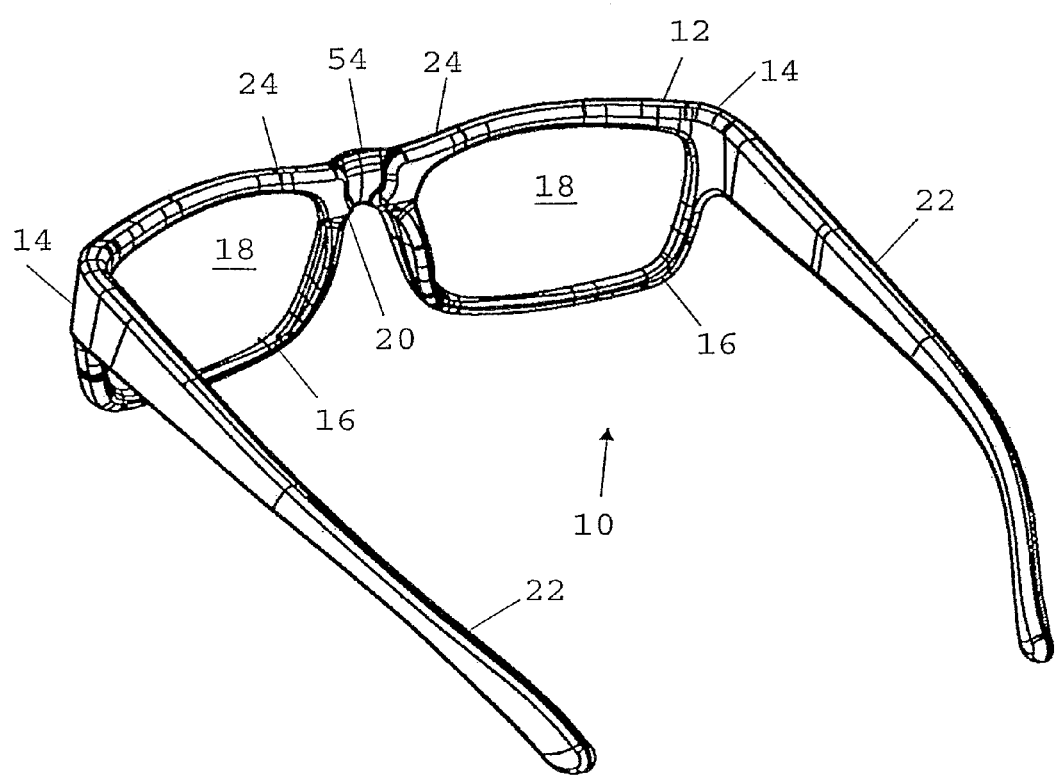
FIG. 2 is a rear isometric view of the eyeglasses of FIG. 1 with the flip-up lens assembly removed, showing the back side of the primary frame structure.

Referring to FIGS. 1-3, eyeglasses 10 according to one embodiment, generally include a primary frame 12 which for example may be made of a rigid plastic material in a molding process, having opposed side ends 14 and including primary left and right sections 16 for retaining a pair of primary lenses 18, respectively. A nose bridge 20 is disposed between and interconnects the primary left and right sections 16. A support device, for example a pair of temples 22, may be pivotally attached to the respective opposed sides ends 14 of the primary frame 12 for supporting the eyeglasses 10 on a user's head. It should be noted that the nose bridge 20 may be made out of a semi-rigid flexible material and connected to the rest of the frame 12 adhesively or by mechanical engagement or otherwise contemplated by someone skilled in the art.

The primary left and right sections 16 of the primary frame 12 according to one embodiment, may be configured as an endless rim surrounding each primary lens 18. Alternatively, the primary left and right sections 16 of the primary frame 12 may be configured to have only an upper part 24 of the rims which engages with only an upper section of a peripheral edge of the respective primary lenses 18.

Figure 5:
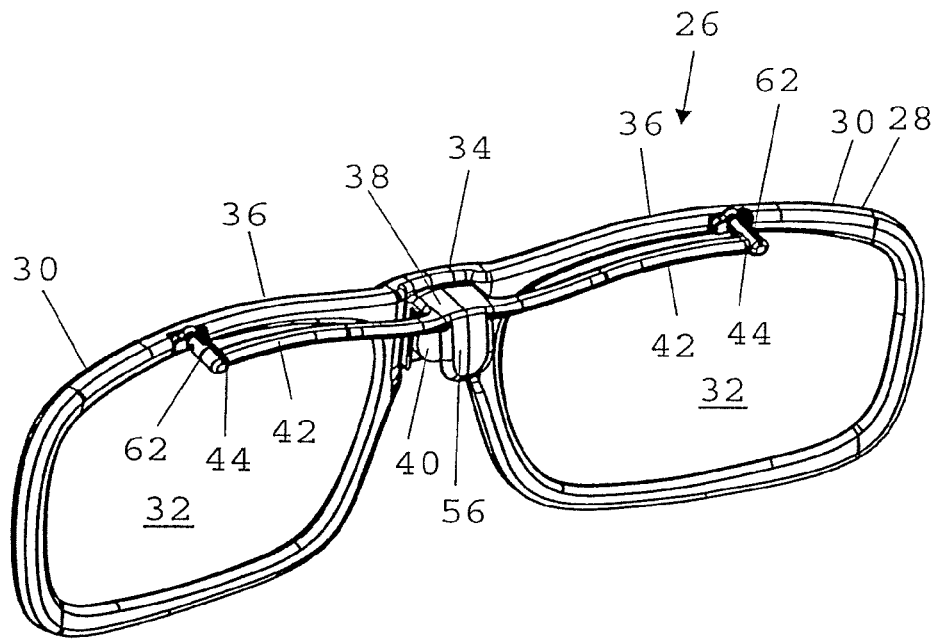
FIG. 5 is a rear isometric view of the flip-up lens assembly of FIG. 4.
Figure 4:
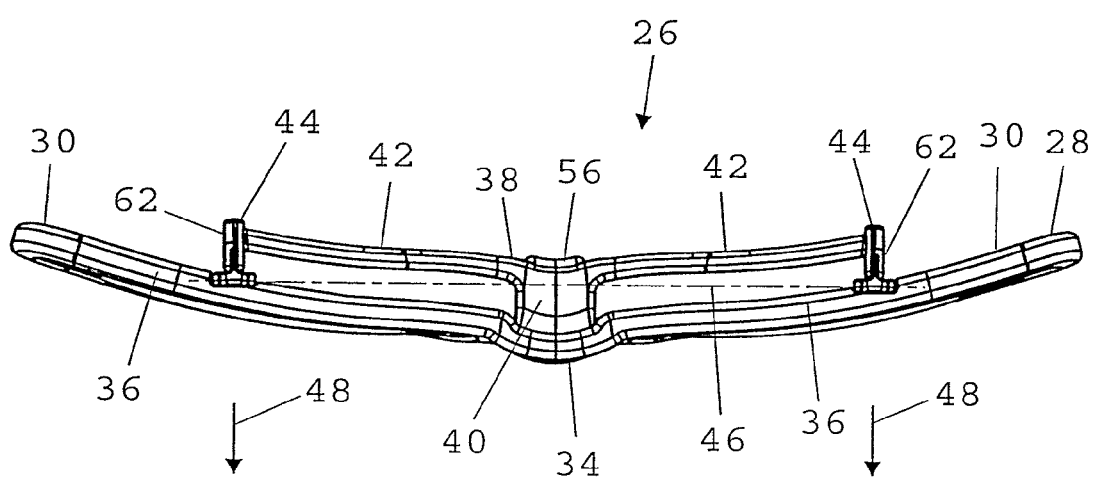
FIG. 4 a top plan view of the flip-up lens assembly used in the eyeglasses in FIG. 1.

Referring to FIGS. 1, 4 and 5, a flip-up lens assembly 26 (a secondary lens assembly) according to one embodiment, may include a secondary frame 28 including respective secondary left and right sections 30 thereof for retaining a pair of secondary lenses 32 which, for example may be tinted for protecting a user's eyes from the sun. A nose bridge 34 is disposed between and interconnects the secondary left and right sections 30 of the secondary frame 28.

The secondary left and right sections 30 of the secondary frame 28 may be configured in an endless rim configuration, corresponding with the primary left and right sections 16 of the primary frame 12. Alternatively, the secondary left and right sections 30 of the secondary frame 28 may also be configured to have only an upper part 36 thereof which engages only with a corresponding upper section of a peripheral edge of the respective secondary lenses 32

Referring to FIGS. 1-8, the flip-up lens assembly 26 according to one embodiment, may include a connector 38 having a base 40, and left and right extensions 42 extending in opposite directions away from the base 40 and terminating in respective left and right distal ends 44. The respective left and right distal ends 44 may be pivotally connected, for example by hinges, to the upper part 36 of the respective secondary left and right sections 30 of the secondary frame 28 about an axis 46 substantially transverse to a user's viewing direction through the eyeglasses 10 (as indicated by arrow 48).

The nose bridge 20 of the primary frame 12 may include a magnet 50 (see FIG. 6) which may be embedded within the plastic material of the nose bridge 20 during the molding process of the primary frame 12. A corresponding magnet 52 may be attached to the base 40 of the connector 38. Attachment of magnet 52 to the base 40 of the connector 38 may be achieved in various ways, for example by adhesives or other securing means or by being embedded during the molding process when the connector 38 is made of plastic material.

Figure 6:
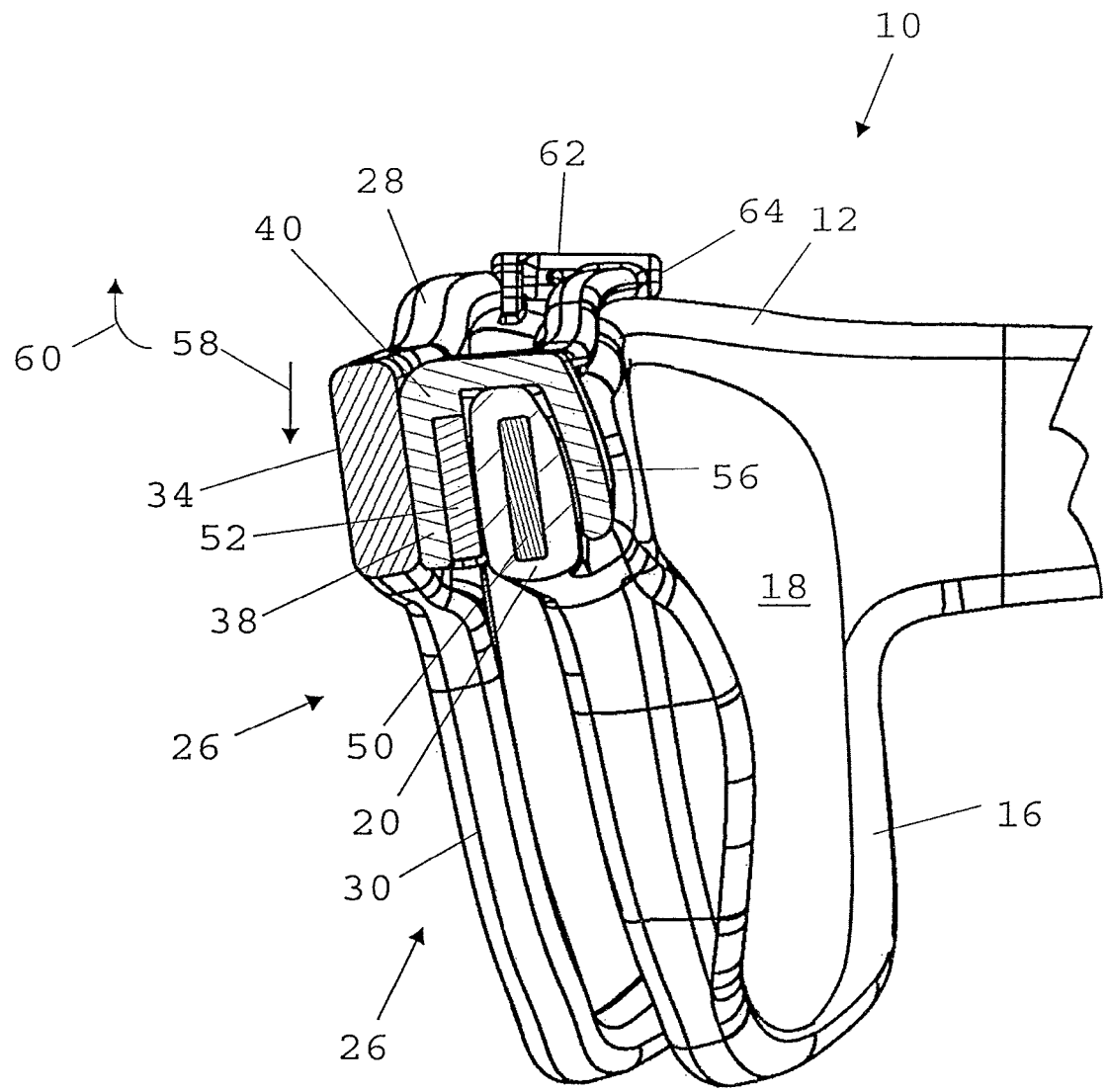
FIG. 6 is a partial cross-sectional view taken along line 6-6 of FIG. 1, showing attachment of the flip-up lens assembly to the primary frame of the eyeglasses.

The connector 38 is pivotally connected to the secondary frame 28 and as such becomes part of the secondary lens assembly 26. Therefore, the entire secondary lens assembly 26 can be removably attached to the front of the primary frame 12 of the pair of eyeglasses 10, when the base 40 of the connector 38 is removably attached to the nose bridge 20 of the primary frame 12 by magnetic forces interacting between the magnets 50 and 52, as shown in FIG. 6.

Figure 8:
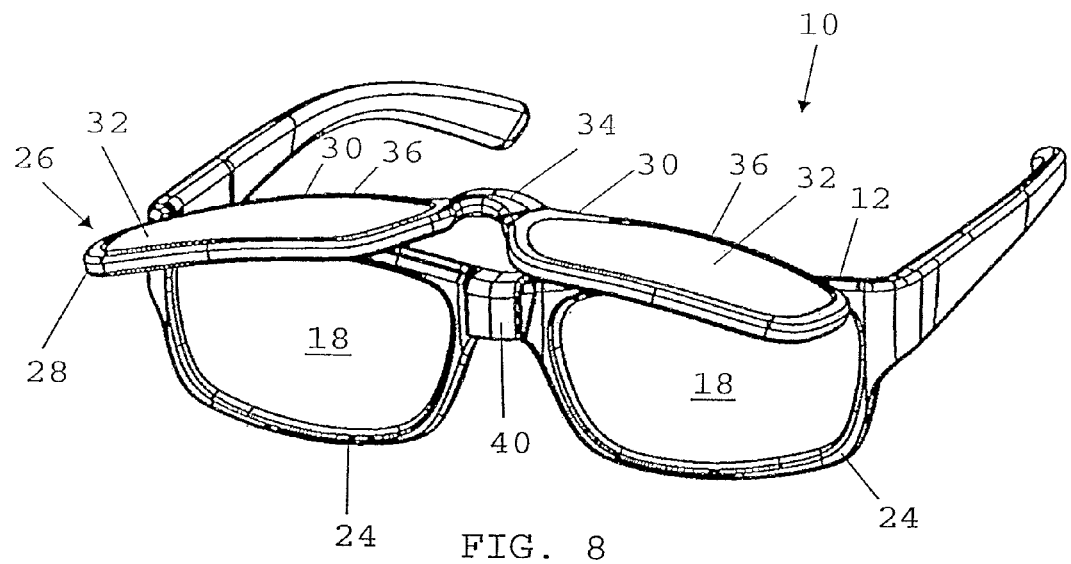
FIG. 8 is a front isometric view of the eyeglasses of FIG. 1 with the flip-up lens assembly pivoted to a position substantially perpendicular to the orientation of the primary frame of the eyeglasses.
Figure 7:
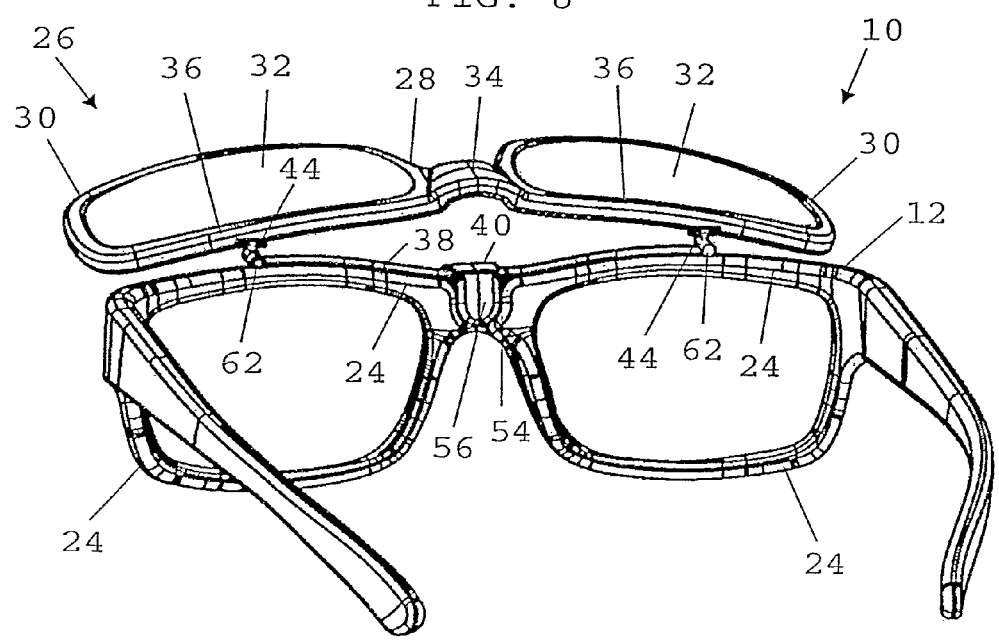
FIG. 7 is a rear isometric view of the eyeglasses of FIG. 1 with the flip-up lens assembly pivoted to a position substantially perpendicular to the orientation of the primary frame of the eyeglasses.

The pivotal connection between the secondary frame 28 and the connector 38 according to one embodiment, may allow the secondary frame 28 together with the secondary lenses 32, to pivot 90 degrees or more from a first position in which the nose bridge 34 of the secondary frame 28 is adjacent and aligned with the base 40 of the connector 38, to a second position in which the nose bridge 34 of the secondary frame 28 flips up and away from the base 40 of the connector 38 such that when the secondary lens assembly 26 is attached to the front of the primary frame 12 by the magnetic forces, the secondary lens 32 with the secondary frame 28 is able to pivot from a "covering" position in which the secondary lenses 32 are substantially parallel to and covering the primary lenses 18, to a flip-up position in which the secondary lenses 32 are pivoted into a position substantially perpendicular to the orientation of the primary frame 12. (The "covering" position is shown in FIGS. 1 and 6 and the flip-up position is shown in FIGS. 7 and 8). The pivoting action may include a position detent at 90 degrees or more so as to at least hold the weight of the secondary frame 28 together with the secondary lenses 32.

Some conventional eyeglasses having flip-up lenses, have both the attachment of a support system of a secondary lens assembly to the primary frame of the eyeglasses and a pivoting connection between the secondary lens frame and the support system located either at the nose bridges of the respective primary and secondary frames or at the opposed side ends of the respective primary and secondary frames. Those conventional pivoting connections are located at a relatively low position with respect to the upper part of the respective secondary left and right sections of the secondary frame such that when the secondary lenses are in the flip-up position, the upper part of the secondary frame may flip over and extend beyond an inner edge of the primary frame of the eyeglasses to contact the user's face or forehead. The eyeglasses 10 according to the described embodiments advantageously has the pivotal connections at a location on an upper part 36 of the respective secondary left and right sections 30 of the secondary frame 28, such that when the secondary lenses 32 are in the flip-up position as shown in FIG. 7, the upper part 36 of the respective secondary left and right sections 30 of the secondary frame 28 does not extend beyond the inner edge of the primary frame 12 of the eyeglasses 10.

The upper part 36 of the respective secondary left and right sections 30 of the secondary frame 28 and the corresponding upper part 24 of the respective primary left and right sections 16 of the primary frame 12 according to one embodiment, may each have a curved profile having an apex (not numbered). The distal ends 44 of the respective left and right extensions 42 of the connector 38, may be pivotally connected to the respective apexes of the curved profile, as shown in FIGS. 1, 4-5 and 7-8.

The base 40 of the connector 38 according to one embodiment, may be configured in an inverted U-shaped configuration to form a hook (not numbered) (see FIG. 6) for receiving the nose bridge 20 of the primary frame 12 to slide upward into the hook when the secondary lens assembly 26 is attached to the primary frame 12 of the eyeglasses 10. The nose bridge 20 of the primary frame 12 may define a recess 54 (see FIGS. 2 and 7) at a back side thereof facing the user for receiving a positioning member 56 (see FIGS. 5 and 7) which is one leg of the inverted U-shaped configuration of the base 40, to slide downwardly into the recess 54 when the base 40 of the connector 38 is attached to the nose bridge 20 of the primary frame 12. The recess 54 may have a shape complimentary to the shape of the positioning member 56 (the leg of the inverted U-shaped configuration of the base 40). Therefore, the positioning member 56 when fitted within the recess 54, may position the flip-up lens assembly 26 to allow the nose bridge 34 of the secondary frame 28 to align with the nose bridge 20 of the primary frame 12 when the secondary lenses 32 are in the "covering" position.

Optionally, the positioning member 56 of the base 40 according to one embodiment, may be configured to be fitted into the recess 54 of the nose bridge 20 in order to allow the magnet 52 attached to the base 40 and the magnet 50 affixed to the nose bridge 20 of the primary frame 12, to be aligned one with the other, thereby creating maximum magnetic forces interacting therebetween for a secure attachment of the secondary lens assembly 26 to the primary frame 12 of the eyeglasses 10.

Alternatively, the positioning member 56 of the base 40 according to another embodiment, may be configured to be fitted into the recess 54 such that the magnet 52 attached to the base 40 and the magnet 50 affixed to the nose bridge 20 of the primary frame 12, are placed within a magnetic force interacting area therebetween but are not perfectly aligned to allow the magnet 50 to be positioned slightly lower relative to the position of the magnet 52, as shown in FIG. 6. In such a magnet position arrangement, because the magnets 50, 52 are not perfectly aligned, the magnetic forces interacting between the magnets 50, 52 tend to pull the magnet 52 downwardly toward alignment with magnet 50. This downward magnetic force as shown by arrow 58, advantageously secures the base 40 in position, against a pulling up trend caused by the flip-up pivoting motion (indicated by arrow 60) of the nose bridge 34 of the secondary frame 28.

The secondary frame 28 may be made from metal or other materials. A metal secondary frame 28 or a metal nose bridge 34 of the secondary frame 28 which is subject to magnetic affect, can be removably secured against the base 40 when the secondary lens 32 and the secondary frame 28 are in the "covering" position.

Referring to FIGS. 4-7, the distal ends 44 of the respective left and right extensions 42 of the connector 38 according to one embodiment, may each have a support member 62 extending substantially perpendicular to the extensions 42 or to the pivoting axis 46. The support members 62 may have a first end (not numbered) pivotally connected to the upper part 36 of the respective secondary left and right sections 30 of the secondary frame 28 and may have a second end 64 (only shown in FIG. 6) which may be configured to be supportable on an upper part 24 of the respective primary left and right sections 16 of the primary frame 12 (such as a small hook engageable with the primary frame 12). Therefore, the connection 38 not only provides a primary attachment location between the base 40 of the connector 38 and the nose bridge 20 of the primary frame 12, but also provides two additional support locations between the distal ends 44 of the extensions 42 of the connector 38 and the upper part 24 of the primary left and right sections 16 of the primary frame 12. The two additional support locations are close to the pivotal connection between the connector 38 and the secondary frame 28, thereby increasing the attachment stability of the secondary frame 30 to the primary frame 12 during the pivoting motion and while in the flip-up position.

The connector according to further embodiment may be used in eyewear having a primary unitary lens with a flip-up secondary unitary lens. For example, the eyewear may have a primary frame having opposed side ends and retaining at least one primary lens. A support device may be operatively attached to the respective opposed side ends of the primary frame for supporting the eyewear on a user's head, and a first magnet may be attached to a central point of an upper part of the primary frame extending between the opposed side ends. A secondary frame may retain at least one secondary lens and may have an upper part extending between opposed side ends of the secondary frame. A connector including a base and left and right extensions extending in opposite directions away from the base and terminating at respective left and right distal ends which are pivotally connected to the upper part of the secondary frame about an axis substantially transverse to a user's viewing direction through the eyewear. Therefore, the secondary frame with the secondary lenses can pivot from a first position in which a central point of the upper part of the secondary frame is adjacent and aligned with the base, to a second position in which the central point of the upper part of the secondary frame can flip up and away from the base. The base may include a second magnet to allow the base of the connector to be removably attached to the central point of the upper part of the primary frame by magnetic forces. In this example, the connector is similar to that described in other embodiments but the eyewear is quite different in style from the eyeglasses as described in other embodiments.

The above description is meant to be exemplary only, and one skilled in the art will recognize that changes may be made to the embodiments described without departing from the scope of the described subject matter. The eyeglasses may be configured in various styles different from what is illustrated in the drawings. Modifications which fall within the scope of the described subject matter will be apparent to those skilled in the art, in light of a review of this disclosure, and such modifications are intended to fall within the appended claims.

The invention claimed is:

1. Eyeglasses comprising:
   a primary frame having opposed side ends and including primary left and right sections retaining a pair of primary lenses, respectively, a first nose bridge being disposed between and interconnecting the primary left and right sections, a support device being operatively attached to the respective opposed side ends of the primary frame for supporting the eyeglasses on a user's head, the first nose bridge including a first magnet;
   a secondary frame including secondary left and right sections retaining a pair of secondary lenses, respectively, a second nose bridge being disposed between and interconnecting the secondary left and right sections;
   a connector including a base and left and right extensions extending in opposite directions away from the base and terminating at respective left and right distal ends, the respective left and right distal ends being pivotally connected to an upper part of the respective secondary left and right sections of the secondary frame about an axis substantially transverse to a user's viewing direction through the eyeglasses in order to allow the secondary frame with the secondary lenses to pivot from a first position in which the second nose bridge is adjacent and aligned with the base, to a second position in which the second nose bridge flips up and away from the base, the base including a second magnet to allow the base of the connector to be removably attached in position to the first nose bridge of the primary frame by magnetic forces between the first and second magnets, in said position of attachment the first and second magnets being within a magnetic force interacting area therebetween and prevented from being fully aligned one with another.

2. The eyeglasses as defined in claim 1 wherein the upper part of the respective secondary left and right sections of the secondary frame each comprises a curved profile having an apex, the distal ends of the respective left and right extensions of the connector being pivotally connected to the upper part of the respective secondary left and right sections at the respective apexes.

3. The eyeglasses as defined in claim 1 wherein the distal ends of the respective left and right extensions of the connector each comprise a support member supported on an upper part of the respective primary left and right sections of the primary frame when the base of the connector is attached to the first nose bridge.

4. The eyeglasses as defined in claim 1 wherein the base of the connector comprises a positioning member for placing the base in said position of attachment to maintain the first and second magnets in the mis-aligned condition.

5. The eyeglasses as defined in claim 1 wherein the base of the connector comprises an inverted U-shaped configuration to form a hook for receiving the first nose bridge, the first nose bridge being slidable upward into the hook.

6. The eyeglasses as defined in claim 1 wherein the first nose bridge of the primary frame defines a recess at a back side thereof facing the user for receiving a positioning member which is one leg of the inverted U-shaped configuration of the base, to slide downwardly into the recess when the base of the connector is attached to the first nose bridge.

7. The eyeglasses as defined in claim 6 wherein the positioning member is fitted into the recess to allow the first magnet to be positioned lower than the second magnet.

8. The eyeglasses as defined in claim 1 wherein the secondary frame is made of metal material subject to magnetic effect, and is removeably secured in the first position by magnetic forces of the second magnet.

9. The eyeglasses as defined in claim 1 wherein the distal ends of the respective left and right extensions of the connector each comprise a support member extending substantially perpendicular to the extensions and having a first end pivotally connected to the upper part of the respective secondary left and right sections of the secondary frame and having a second end configured to be supportable on an upper part of the respective primary left and right sections of the primary frame when the base of the connector is attached to the first nose bridge.

10. Eyewear comprising:

a primary frame having opposed side ends and retaining at least one primary lens, a support device being operatively attached to the respective opposed side ends of the primary frame for supporting the eyewear on a user's head, and a first magnet attached to a central point of an upper part of the primary frame extending between the opposed side ends;

a secondary frame retaining at least one secondary lens, the secondary frame having an upper part extending between opposed side ends of the secondary frame; and a connector including a base and left and right extensions extending in opposite directions away from the base and terminating at respective left and right distal ends, the respective left and right distal ends being pivotally connected to the upper part of the secondary frame about an axis substantially transverse to a user's viewing direction through the eyewear in order to allow the secondary frame with the secondary lenses to pivot from a first position in which a central point of the upper part of the secondary frame is adjacent and aligned with the base, to a second position in which the central point of the upper part of the secondary frame flips up and away from the base, the base including a second magnet to allow the base of the connector to be removably attached in position to the central point of the upper part of the primary frame by magnetic forces, in said position of attachment the first and second magnets being within a magnetic force interacting area therebetween and prevented from being fully aligned one with the other.

\* \* \* \* \*